June 18, 1968 R. DE MARCELLUS 3,388,951
POWER BRAKING SYSTEM
Filed Sept. 30, 1966
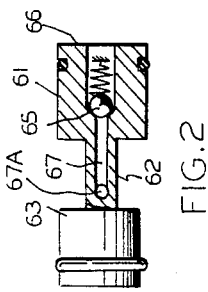
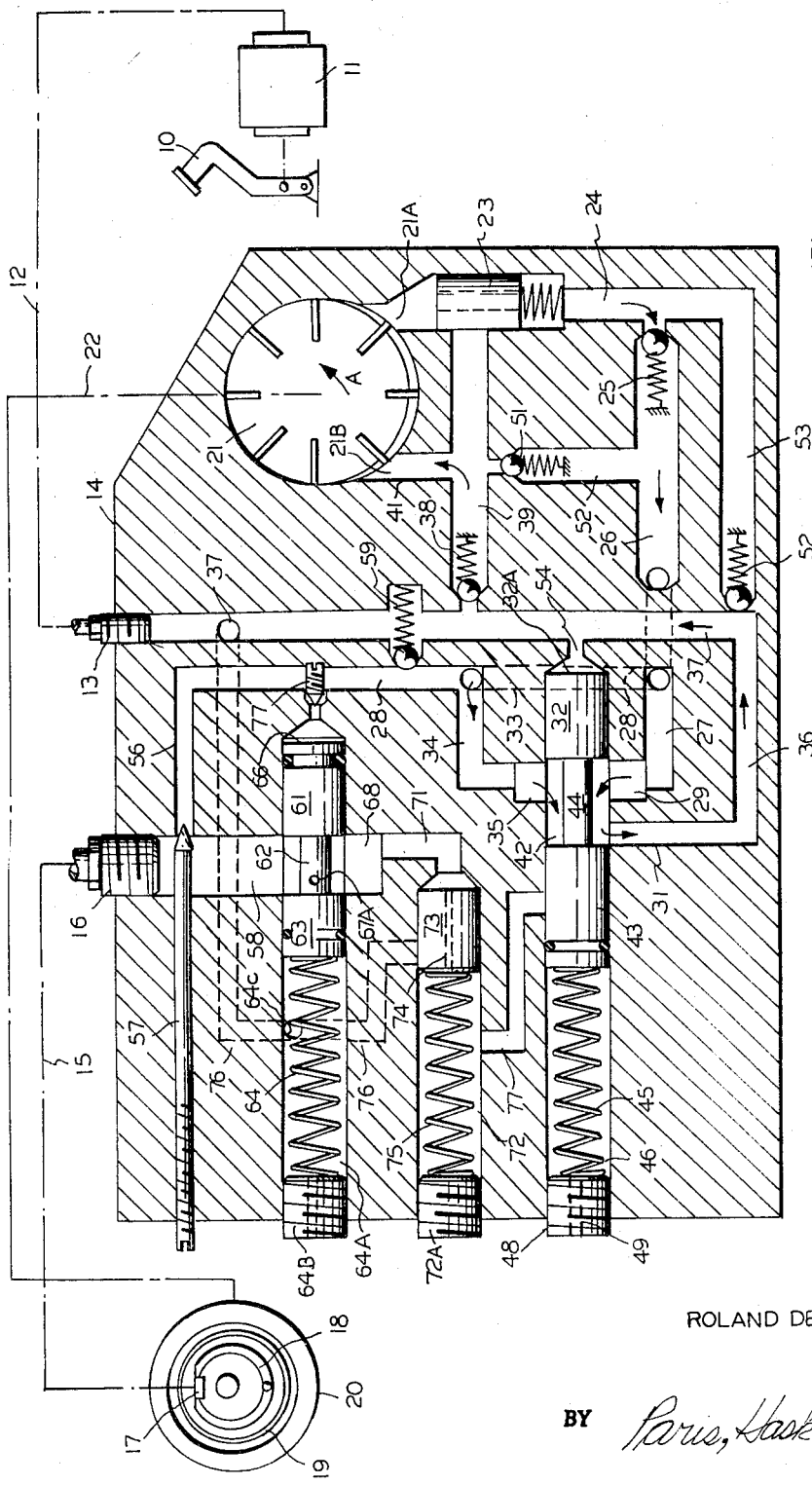
INVENTOR
ROLAND DEMARCELLUS
BY Paris, Haskell & Levine
ATTORNEYS United States Patent Office 3,388,951
Patented June 18, 1968

3,388,951
POWER BRAKING SYSTEM
Roland de Marcellus, 704 N. State St.,
Chicago, Ill. 60610
Continuation-in-part of application Ser. No. 383,062,
July 16, 1964. This application Sept. 30, 1966, Ser.
No. 583,384
12 Claims. (Cl. 303—21)

ABSTRACT OF THE DISCLOSURE

An antiskid, hydraulic power braking system is disclosed. The hydraulic power braking force is derived from the traction wheels of a vehicle, and a selected portion of that derived power is utilized for braking pressure in accordance with normal brake pedal actuation. In case of a panic stop, where maximum power braking force is utilized bringing the vehicle to the skid point, under prevailing traction conditions, a peak pressure sensor and pressure regulator system operate to limit the braking pressure to that maximum amount reached before skid, and the applied braking pressure is immediately reduced to the valve just under that peak pressure.

The present invention is a continuation-in-part of my co-pending application, Ser. No. 383,062, filed July 16, 1964, and entitled Power Braking System, now Patent No. 3,288,538.

The present invention relates to hydraulic braking systems for vehicles, and particularly to such a system which is substantially skid proof.

One common failing with most available power braking systems is that the braking power available can frequently exceed the frictional forces existing between the wheels and the roadway, whereby the wheels are locked and the vehicle is caused to skid. In my copending application, this problem is partially eliminated by deriving the power assist braking force from the rotation of the wheels, their running assembly, or other drive component of the vehicle. Thus, if the initial braking application provides an excessive braking force, as the wheels slow down, the power assist braking force is likewise diminished, and therefore, before the wheels can actually lock and cause a skid, the braking force is automatically diminished below that required to cause a skid. However, there is an inherent lag between a reduction in the output pressure of the power system and an equal reduction in pressure actually present in the brake cylinders because of the need for the brake cylinders to retract and the braking fluid to effect a return flow to the low pressure area. It has been observed that in a panic stop, where full power assist is initially obtained, reliance upon the foregoing system is not adequate at all speeds or under all road conditions to prevent a skid due to locking of the wheels. Whereas in a panic stop the foregoing system can respond at certain speed ranges to diminish the braking pressures appropriately so as to prevent locking of the wheels, that speed range is a function of the hydraulic design of the system and cannot accommodate to all speed ranges and braking conditions.

The present invention is an improvement of the above-described system and is a continuation in part of said co-pending application. The present invention is intended substantially to prevent locking of the wheels under panic braking conditions at substantially any vehicle speed and under substantially any condition of traction between the wheels and the roadway. In addition, the present system is adapted under panic braking conditions to apply that maximum braking force utilizable, short of locking the wheels, for the conditions of traction existing between the vehicle wheels and the roadway. In general, these results are obtained by including within the above described power braking system of my said prior application a variable regulator valve which controls the proportion of that hydraulic pressure available from the power assist system which is actually applied to the wheel brakes in accordance with the traction that exists between the wheels and the roadway.

It is accordingly one object of the present invention to provide a power assist braking system which develops its power from the rotation of the wheels of the vehicle.

Another object of the present invention is to provide a power braking system which, in a panic braking application, controls the proportion of braking power applied to the wheels in accordance with the traction existing between the wheels and the roadway.

And still another object of the present invention is to provide such a power braking system which develops substantially the maximum braking force usable in a panic stop short of locking the wheels and causing a skid.

Other objects and advantages of the present invention will become apparent to those skilled in the art from a consideration of the following detailed description of one exemplary specific embodiment thereof, had in conjunction with the accompanying drawings, in which like numerals refer to like or corresponding parts, and wherein:

FIG. 1 is a partially sectional and partially schematic view of an hydraulic power braking system embodying the present invention; and FIG. 2 is an enlarged and partially sectional view of one piston employed in the embodiment of FIG. 1.

Referring to FIG. 1, there is shown the usual manual brake pedal 10 operating on master cylinder 11 as in the conventional vehicular hydraulic braking system. Hydraulic pressure from the master cylinder is conducted along the brake line 12, schematically shown as a broken line, to coupling 13 in the block 14 housing the power assist system of the present invention. In the absence of any power assist, as for example when the vehicle is stationary or if the power assist system should break down, the manual braking pressure is conducted along channel 37, through check valve 52, channel 53, check valve 25, channels 26 and 28 (and a parallel path comprising channel 27, port 29, cylinder 42, port 35, and channel 34 to channel 28), thence through channel 56 to channel 58. Channel 58 is connected through coupling 16 to a second hydraulic line 15 also schematically shown as a broken line, which runs to the wheel cylinder 17 on wheel 20. Thus, when foot pressure is applied to brake pedal 10, manual braking pressure is applied to wheel cylinder 17, which operates to force the brake shoes 18 against the brake drum 19 in the conventional manner. Upon release of the brake pedal 10, manual braking pressure is of course relieved, and this is effected through substantially the same path as above-described, except that from channel 28, the return flow is through channel 34 and port 35 and parallel channel 27 and port 29 to cylinder 42, and through channels 31 and 36 to channel 37, instead of through the check valves 25 and 52 which block flow in the return direction.

For purpose of illustration only one vehicle wheel 20 is shown. Obviously, the hydraulic line 15 would be branched to feed the hydraulic pressure to a plurality of wheels in the usual vehicle.

The power assist braking system of the present invention is coupled into the above-described manual braking line. Within the power assist housing block 14 is a pump, shown for illustrative purposes as a vane pump 21, whose rotor is mechanically connected to the wheel 20 to be driven thereby, as schematically indicated by the broken line 22. Instead of being driven by wheel 20, the effects of the invention can be obtained by connecting the pump 21 to be driven by any member of the drive or running gear that moves in correspondence with the wheels. Rotation of wheel 20 in a direction to drive the vehicle forward, rotates the pump rotor in the direction indicated by arrow A, setting up a primary flow circuit starting with the outlet port 21A of the pump, through flow control valve 23, channel 24, check valve 25, channel 26, channel 27, port 29 to cylinder 42 (a parallel flow from channel 26 through channel 28, channel 34, and port 35 to cylinder 42) thence through channel 31, channel 36, a part of channel 37, through check valve 38, and channels 39 and 41 to the inlet port 21B of pump 21. Previously mentioned flow controller 23 is provided to relieve the pump output in excess of that caused by a predetermined relatively slow vehicle speed, so that the flow into the above-defined power assist flow channel will be substantially uniform over the greater portion of the normal operating speed range. This result is obtained by the fact that valve 23 bypasses that excess portion of the flow through channel 39 directly back to the pump inlet port 21B. The parallel flow paths provided by channel 27 to port 29 of cylinder 42, and channels 28 and 34 to port 35, are arranged to balance the pressures acting on the cylindrical surface of piston 32 as will be apparent from subsequent descriptions.

The above-described primary flow circuit for the pump 21 is utilized when the vehicle is moving in a forward direction. When the vehicle is driven in reverse, pump 21 obviously will be rotated in the direction opposite from arrow A. In that event, port 21B becomes the pump outlet and port 21A the pump inlet, and the primary flow circuit comprises from outlet port 21B, channel 41, check valve 51, channels 52, 26, and 27 to port 29 (and parallel path from channel 26 through channels 28 and 34 to port 35), thence through cylinder 42 to channels 31 and 36, check valve 52, and channels 53 and 24 to pump inlet port 21A. Since it is contemplated that in reverse the speeds would not likely exceed that which the flow relief valve 23 is designed to pass, no flow relief valve has been provided for this direction of flow.

Piston 32 operating in cylinder 42 is designed to valve the ports 29 and 35. Spring 45 in bore 46, bearing between plug 48 on one end and the piston assembly 43, 44, 32 on the other end, biases the piston assembly to the right into the position shown in the drawings, leaving ports 29 and 35 completely unobstructed. With the piston in this position, the primary flow circuit of pump 21 develops very little pressure in the high pressure portion of the circuit at channels 27 and 28. Accordingly, the pressure applied through channel 56 and line 15 to wheel brake cylinder 17 is correspondingly low, and the brake structure is designed so that this low pressure from the primary flow circuit does not actuate the brakes.

Piston assembly 43, 44, 32 can, however, be moved to the left as shown in the drawings, against the force of spring 45, so that piston portion 32 restricts and even closes ports 29 and 35. To enable this movement, plug 48 is vented at 49 to permit ready egress and ingress of air from and to chamber 46. This movement of piston assembly 43, 44, 32 is effected by operation of manual foot pedal 10. Pressure on foot pedal 10 causes the output pressure from master cylinder 11 to be applied through line 12 to channel 37 in the low pressure side of the pump's primary flow circuit, and from channel 37 through port 54 to the end face 32A of piston 32, driving the piston assembly 43, 44, 32 to the left against the bias of spring 45. Assuming wheel 20 is driving pump 21, the resultant constriction of ports 29 and 35 by piston 32 causes an increase in pressure at channels 27 and 28 of the main flow path of the pump 21, which is transmitted through channels 56 and 58 and line 15 to apply the brakes 17, 18, 19.

The greater the foot pressure applied to pedal 10, the greater is the movement of piston 32 and the greater the constriction of ports 29 and 35, resulting in greater braking pressure being applied to the brakes of wheel 20. As the wheel approaches a stop, so does the rotor of pump 21, and the power assist becomes nil and the braking force is almost entirely manual through the manual pressure circuit described earlier. In the event this braking force should exceed the traction between the wheels and the roadway, the wheels lock. Since pump 21 then stops, the braking pressure is automatically relieved, and traction is resumed. Actually, for many conditions, as the braking pressure on pedal 10 is gradually increased to a point where the braking pressure approaches that at which the wheels would lock, and as the wheels slow down, before the heels actually lock, the wheel and pump speeds are reduced to a value below the flow capacity of valve 23, and the braking pressure is reduced before the lock or skid condition results. Thus, the present system, as thus far described, affords a significant degree of protection against braking skids.

In the foregoing description of the normal braking operation of the present system, no mention was made of piston assembly 63, 62, 61 or of piston 73 because these members play no effective role. In normal braking, piston 43 is not moved to the left in the drawing a sufficient distance to open channel 77. Since piston 73 contains a small axial bore 74, the pressure developed in channel 58 is transmitted through channels 68 and 71 and through bore 74, so that the hydraulic pressures on both sides of piston 73 remain equal and this piston does not move. The increased pressure in channel 58 resulting from the normal braking operation is transmitted through port 67A and axial bore 67 in piston assembly 61, 62, 63, and through check valve 65 to the face 66 of piston 61, thereby moving this piston assembly to the left in the drawing against the bias force of spring 64 housed in bore 64A and bearing between the piston assembly and plug 64B. This movement of piston assembly 61, 62, 63 valves or constricts the flow passage between channels 58 and 68, but since as stated above, there is no significant flow in this path during normal braking operation, the movement of this piston assembly has little or no effect on the operation of the system. To permit movement of piston assembly 63, 62, 61, the cylinder 64A is vented through bore 64C to channel 76 which connects with the low pressure channel 37.

In the event of a panic stop, however, when the vehicle operator seeks to apply maximum braking force suddenly by applying maximum manual pressure to pedal 10, the resultant increase in pressure in channel 37 drives piston assembly 43, 44, 32 through a maximum traverse to the left in the drawing until piston 32 closes ports 29 and 35, developing maximum hydraulic pressure in channel 28 on the high pressure side of the pump's primary flow path relative to the valve formed by piston 32 and ports 29 and 35. It is preferred that a suitable stop (not shown) be provided to insure that the traverse of piston assembly 43, 44, 32 is stopped after piston 32 completely closes ports 29 and 35 and before this piston can obstruct the opening from cylinder 42 into channel 31.

Concurrently with the movement of piston assembly 43, 44, 32 to the left toward closing of ports 29 and 35, the high pressure build up in channel 28, and consequently in channels 56 and 58, causes the valving piston assembly 61, 62, 63 to move to the left to obstruct or constrict the flow passage between channels 58 and 68 as above described. Piston assembly 61, 62, 63 continues to move to the left with increasing braking pressure until the pressure developed in channel 58 and the brake cylinder 17 rises to that value which causes the wheel 20 to lock and hence stops the pump 21.

With the valving piston assembly 61, 62, 63 now set in accordance with the determined skid pressure piston assembly 43, 44, 32 reaches its limit of movement to the left, and piston 43 has moved past the opening of channel 77 and thereby opens it through cylinder 42 to channel 31 in the low pressure side of the pump's primary flow path relative to the valve formed by piston 32 and port 29 and 35. This action immediately lowers the pressure in cylinder 72, causing piston 73 to be moved to the left in the drawing, against the bias of spring 75 housed in cylinder 72 and bearing between the piston 73 and the plug 72A. This movement of piston 73 opens communication between channel 71 and channel 76, which in turn is connected to channel 37 in the low pressure side of the pump primary flow path. With hydraulic flow now established across valving piston assembly 61, 62, 63, the hydraulic pressure in channel 58 immediately drops to a value determined by the variable constriction established by the piston assembly 61, 62, 63 in the flow path between channels 58 and 68, in combination with the fixed, although adjustable, constriction established in this flow circuit by adjustable needle valve 57. These two valves together thereby form a pressure regulator. As a result of this action, the pressure applied to the brakes is reduced to and hold at a value slightly below the skid pressure, and the wheels resume rotation until the vehicle is brought to a stop.

Thus it will be appreciated that the ultimate pressure attained in channel 58 and hence in the brake cylinder 17 is controlled in a panic stop by the degree of constriction of the flow path between channels 58 and 68 effected by piston assembly 61, 62, 63. This degree of constriction in turn is controlled by the amount of braking pressure required to lock the wheels. Thus in effect, the degree of closure of the flow path between channels 58 and 68 is a function of the traction or amount of friction between the vehicle wheels and the roadway, and if the parameters of the system are properly adjusted, such as the opening of needle valve 57, the bias spring pressures, etc., the ultimate braking pressure attained is substantially just below that which was found to lock the wheels and induce a skid.

Once the panic stop setting of the system as above described is obtained, as the wheels slow down piston assembly 61, 62, 63 is held substantially in the established positon because of the action of check valve 65, which prevents the reverse hydraulic flow through bore 67 that would be required to move piston assembly 61, 62, 63 back to the right to the position shown in the drawing. Obviously, if this action were permitted, the braking pressure would be released before the vehicle could be brought to a stop. However, once the manual pressure is removed from pedal 10, permitting piston assembly 43, 44, 32 to be returned to the piston shown in the drawing by bias spring 45, the pressure in channels 28, 56, 58, 68, and 71 is returned to their normal relatively low value, enabling spring 75 to return piston 73 to its normal position shown in the drawing, and spring 64 to return piston assembly 61, 62, 63 to its position shown in the drawing, the fluid present in cylinder 64A to the right of piston face 66 being vented through the needle valve 77.

In panic stop operation as above-described there is a momentary locking of the wheels, as the braking pressure exceeds the wheel traction, and before channel 71 is opened to channel 76, permitting the automatic regulator valve combination of 57 and 61, 62, 63 to take effect. This locking action is however only momentary, and is promptly superceded by the variable control of the pressure regulator system.

A further feature of the present system during panic stop operation is automatic compensation for brake fading resulting from heating of the brake linings during a prolonged braking operation. This effect is accomplished by needle valve 77, adjusted to an appropriate setting in relation to needle valve 57. There is a pressure drop across needle valve 57 during the panic stopping operation. As a result, a slow flow of high pressure fluid passes through the needle valve 77 from channel 28, causing the piston assembly 61, 62, 63 to creep slowly to the left in the drawing, and thereby cause a slight increase in constriction of the flow through this valving assembly and a corresponding slight increase in the braking pressure applied through conduit 15 to the wheel cylinders.

One element shown in the drawing and not yet described is check valve 59. This valve is merely a by-pass from the high pressure side of the pump primary flow path at channel 28, to the low pressure side of said flow path at channel 37. It is merely a safety valve to relieve the pressure should it become excessive on the high pressure side of the system.

There is thus described for purpose of illustration one specific embodiment of the invention, embodying a power assist braking system which derives its power assist from the rotational movement of the wheels or their associated structure having corresponding movement, so that the amount of power assist available is reduced as the rotational speed of the wheels approaches zero. In addition this system includes an automatic regulator valve, embodied in piston assembly 61, 62, 63, effective in a panic braking action to limit the ultimate amount of braking power available to a value just below that which, for the existing conditions of traction between the wheels and the roadway, will lock the wheels and cause the vehicle to skid. It is contemplated that the primary application of the present invention would be in automotive braking systems, and therefore the present description of the invention is expressed in that context. However, it is apparent that the invention is not limited to that environment, and can be adaped to meet the braking requirement of other environments. Therefore, when reference is made herein and in the appended claims to deriving the power assist from the movement of the wheels, their running assembly, or other drive component of the vehicle, it should be interpreted in its broader context as applicable to any element whose motion is to braked and whose traction is to be maintained during the braking operation. Certainly numerous adaptations, modifications and variations of the described embodiment will become apparent to those skilled in the art, and such as are embraced by the spirit and scope of the appended claims are contemplated as being within the purview of the present invention.

What is claimed is:

1. In an hydraulic power braking system for braking the movement of a traction means, having a brake means for said traction means, a pump driven by said traction means to operate in accordance with the movement of said traction means, a primary flow path for said pump including a valve and having a low pressure side on one side of said valve and a high pressure side on the other side of said valve, means for operating said valve to control the pressure on said high pressure side, and means coupling the high pressure side to said brake means to operate the same; the improvement comprising a variable hydraulic pressure regulator means coupled to said high pressure side and including means variably settable in response to the peak hydraulic pressure applied to said brake means to sense a brake pressure at which traction of said traction means is lost, and means cooperating with said variable means limting the amount of pressure in said high pressure side to an amount less than that at which traction was lost in accordance with the setting of said variable means.

2. In an hydraulic power braking system as set forth in claim 1, said variable pressure regulator means comprising a secondary flow path between said high and low pressure sides, said means responsive to peak hydraulic pressure being a valve means in said secondary flow path responsive to peak pressure in said high pressure side, and said means cooperating with said variable means being a second valve in said secondary flow path to open and close said secondary flow path.

3. In an hydraulic power braking system as set forth in claim 2, means for operating said second valve in said secondary flow path in conjunction with said valve in said primary flow path.

4. In an hydraulic power braking system as set forth in claim 3, said means for operating said second valve including means for opening said second valve only when said valve in said primary flow path is closed.

5. In an hydraulic power braking system for breaking the movement of a traction means, having means for deriving power from the movement of said traction means, brake means for said traction means, and hydraulic means for applying a selected amount of said derived power to said brake means as hydraulic pressure; the improvement comprising a variable hydraulic pressure regulator means in said hydraulic means including valving means variably settable in response to the peak hydraulic pressure applied to said brake means to sense the braking pressure at which the traction of said traction means is lost, and means cooperating with said variable means for limiting the amount of hydraulic pressure applied to said brake means by a said hydraulic means to an amount less than that at which traction was lost in accordance with the setting of variable means.

6. An hydraulic braking system for a traction means, comprising a brake means for the traction means, a manual braking actuator, an hydraulic line coupling said actuator and said brake means for applying manual hydraulic braking pressure to said brake means, a pump means, means coupling said pump means and traction means to drive said pump means in accordance with the movement of said traction means, a primary hydraulic flow path for said pump means, a valve in said flow path providing a high pressure side for said flow path on one side of said valve and a low pressure side for said flow path on the other side of said valve, said hydraulic line and flow path being common at said valve with the actuator coupled to the low pressure side of said valve and the brake means coupled to the high pressure side of said valve, means for adjusting said valve in response to hydraulic pressure induced in the low pressure side of said flow path by said actuator to apply hydraulic braking pressure to said brake means derived from said pump means, and variable hydraulic pressure regulator means coupled to said high pressure side of said flow path and including means variably settable in response to the peak hydraulic pressure applied to said brake means to sense a brake pressure at which traction of said traction means is lost, and means cooperating with said variable means limiting the amount of pressure in said high pressure side of said flow path to an amount less than that at which traction was lost in accordance with the setting of said variable means.

7. An hydraulic power braking system as set forth in claim 6, wherein said variable pressure regulator means comprises a secondary flow path between said high pressure side and said low pressure side of said primary flow path, said means responsive to peak hydraulic pressure is a valve means in said secondary flow path responsive to peak pressure in said high pressure side of said primary flow path, and said means cooperating with said variable means is a second in said secondary flow path to open and close said secondary flow path.

8. An hydraulic power braking system as set forth in claim 7, and furfther including means for operating said second valve in said secondary flow path in conjunction with said valve in said primary flow path.

9. An hydraulic power braking system as set forth in claim 8, wherein said means for operating said second valve includes means for opening said second valve only when said valve in said primary flow path is closed.

10. An hydrualic power braking system as set forth in claim 6, including means releasing said pressure regulator variable means from its peak pressure response setting on removal of braking pressure.

11. An hydraulic power braking system as set forth in claim 6, and including means for moving said regulator variable means from its peak pressure setting to a position to increase the braking pressure slightly during the braking operation.

12. An hydraulic power braking system as set forth in claim 6, and including means for causing hydraulic flow in the same direction across said valve for both forward and reverse movement of said traction means.

References Cited

UNITED STATES PATENTS 2,919,162   12/1959   Roberts _____ 303—21

DUANE A. REGER, *Primary Examiner.*